July 21, 1964   J. L. MELSE ETAL   3,141,840
DEVICE FOR PRODUCING FERROMAGNETIC PARTICLES
Filed March 31, 1961
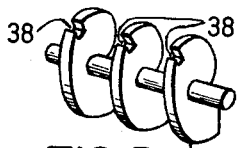
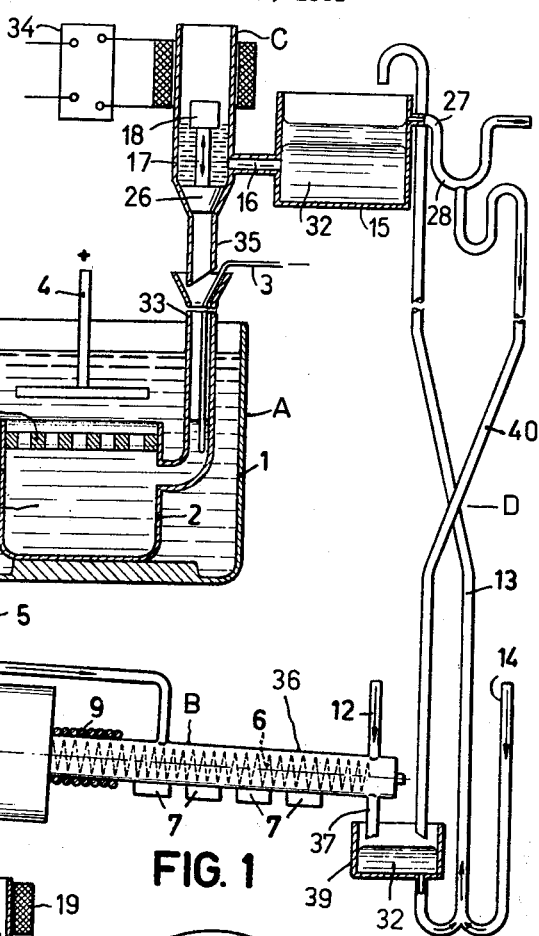
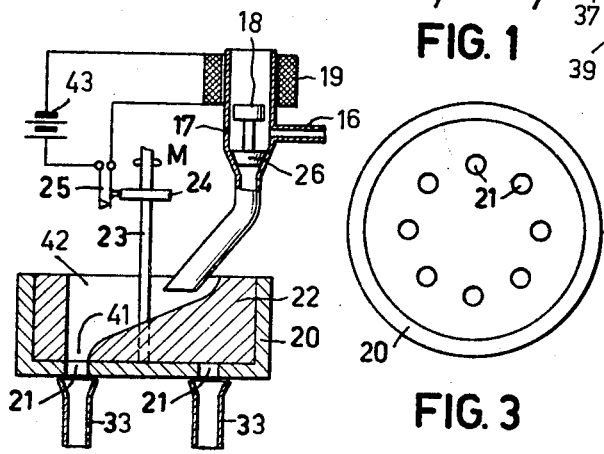
INVENTOR
JAN L. MELSE.
PETRUS BAEYENS.
EWOUD A. BOONZAJER FLAES
BY *Frank R. Trifari*
AGENT 3,141,840
DEVICE FOR PRODUCING FERROMAGNETIC PARTICLES
Jan Leendert Meise, Petrus Baeyens, and Ewoud Adriaan Boonzajer Flaes, all of Eindhoven, Netherlands, assignors to North American Philips Company, Inc., New York, N.Y., a corporation of Delaware
Filed Mar. 31, 1961, Ser. No. 99,933
Claims priority, application Netherlands Apr. 6, 1960
3 Claims. (Cl. 204—220)

Our invention relates to a method of and device for manufacturing elongated particles of a ferromagnetic material particularly iron.

It is known, for instance from U.S. Patent 2,974,104, to form magnetic bodies, for instance permanent magnets, from metallic particles, for example of Fe or Fe and Co, which have a width between about 100 and 1000 A. and are elongated with the length and width in a ratio of about 1.5:1. As a result it is ensured that no more than one Weiss domain will be present in the width direction and that magnetization can not be carried out by displacing the Bloch walls, which method results in low coercive forces. Magnets made from these elongated particles have a strongly anisotropic shape and high coercive forces.

Such ferromagnetic particles are produced by electrolytically precipitating the particles in an electrolytic cell from a solution of ions of the metal into the surface layer of a cathode consisting of a liquid metal (f.i. mercury) while its surface is at rest. The surface layer containing the ferromagnetic particles is removed from the cathode and the metal mixture thereof is subjected to an aging method by heating at about 200° C. for several minutes. The mercury is then substantially completely removed and the remaining ferromagnetic particles are mixed with nonmagnetic material, for example an organic thermoplastic substance, lead metal or a lead alloy. The iron particles are orientated in a magnetic field and the assembly is finally compressed into a compact body.

We have found that such a method has the disadvantage that it is difficult to remove the iron-containing surface layer of the mercury. With a continuous process this is preferably carried out at regular intervals, because the iron particles arriving at the surface readily grow to large particles in an iron-saturated surface layer, and this deleteriously affects the properties of the magnetic bodies formed from the particles. It has been proposed, for instance in the above-mentioned patent, to remove the iron-containing surface layer with the aid of a magnet, but for an automatic, continuous process this is, of course, not to be preferred. We have attempted to overcome this difficulty by arranging a body below the mercury surface and vibrating the same at regular intervals in order to agitate the surface layer and move the iron particles downward into the mercury mass. However, the results were likewise unsatisfactory. We also attempted to overcome the difficulties by using a scraper to remove the surface layer from the cathode at certain intervals, but this had the drawback that the liquid metal containing the particles stuck to the scraper.

The object of our invention is to overcome the above difficulties and provide a method and a device by which small, elongated particles of a ferromagnetic metal can be produced in a continuous process and in a simple and inexpensive manner.

In accordance with the invention, we arrange within a electrolytic cell at least one separate vessel containing a nonmagnetic liquid metal cathode and intermittently supply liquid metal and at a point beneath the surface of the cathode, to thereby remove surface layer portions, containing the ferromagnetic metal by overflowing the same. The overflow is drained from the electrolytic cell and separated into a magnetisable fraction and a nonmagnetisable fraction, after which the magnetisable fraction is processed.

In order that our invention may be clearly understood and readily carried into effect we shall describe the same in more detail with reference to the accompanying drawing in which:

FIGURE 1 is a diagrammatic view, partly in section, of a device according to the invention,
FIG. 2 is a sectional side view of a portion of FIGURE 1 with a distributing device,
FIG. 3 is a top view of a distributing valve shown in FIGURE 2,
FIG. 4 is a plan view of a cam shown in FIG. 2, and
FIG. 5 is a prospective view of a portion of a helical conveyor shown in FIGURE 1.

The device shown in FIGURE 1, which is suitable for the continuous production of elongated particles of a ferromagnetic metal, such as iron, comprises an electrolytic cell A, a separating device B for separating the magnetizable fraction from the nonmagnetizable fraction, a dosing device C for supplying the nonmagnetic liquid metal to cell A, and a recirculating device D for returning to nonmagnetic liquid metal from the separating device B to the dosing device C.

Electrolytic cell A comprises a container 1, for instance of glass lined metal, filled with an electrolyte 30 in the form of an aqueous solution of ions of the metal, f.i. iron, from which the elongated particles are to be separated. Partly immersed within electrolyte 30 is an anode 4 adapted to be connected to the positive of a supply source (not shown) and a liquid cathode 31 comprising a container 2, for instance of glass filled with a nonmagnetic liquid metal 32, for instance mercury. Cathode 31 is of cup-shape and is provided with an inlet tube 33 whose lower end is connected to container 2 at a point below the surface of the liquid metal 32 and whose upper end extends above the surface of electrolyte 30. Passing through tube 33 and into liquid 32 is a supply lead 3 adopted to be connected to the negative terminal of the supply source.

The nonmagnetic liquid metal 32, for instance mercury, is supplied to container 2 from a reservoir 15 through dosing device C which is connected through a tube 16 to reservoir 15 and has an outlet opening 35 arranged over the entrance of inlet tube 33. Dosing device C is of the electromagnetic type, and has a housing of nonmagnetic material containing a valve 26 secured to an iron core 18 actuated in the direct of the arrow by a solenoid 19. Solenoid 19 is energized periodically by a suitable timing mechanism 34 so that the proper amounts of liquid metal 32 will be fed to inlet tube 33. As timing devices for supplying current pulses of various durations and at various intervals are well known in the art, a detailed description of the same is believed to be unnecessary.

The bottom of container 1 is connected to separator B by means of a tube 5 provided with a goose neck which is always filled with the heavier metal so that none of the liquid electrolyte 30 will be carried over to separator B.

When liquid metal 32 is introduced into tube 33 by means of dosing device C the upper surface portion of liquid 32, which contains the metal particles, will overflow as indicated by dotted lines in FIGURE 1, and the overflow will pass through tube 5 to separator B. If the liquid metal 32 is introduced periodically into container 2 the surface of the cathode it will exhibit a strongly damped vibration. However, we have found that this does not deleteriously affect the quality of the separated particles of ferromagnetic metal and thus it is not necessary to interrupt the electrolysis during this vibrating period. It is advantageous, that the vibrating is further damped by placing a perforated plate 44 of suitable material, such as rubber, within container 2 and slightly below the surface of the liquid 32.

Separator B comprises a tubular housing 36 which is inclined, for example, at an angle of 3° so that the right-hand end is lower and which is provided at the lower right-hand end with an outlet tube 37 for the nonmagnetic liquid metal and at its upper lefthand end with an outlet 11 for the mixture of the liquid particles of the ferromagnetic material and magnetic liquid. Rotatably mounted within housing 36 is a helical-shaped conveyor 6 provided at one end with a pulley driven by a belt from an electric motor 10. As shown more clearly in FIGURE 5 each turn of the rotary conveyor 6 is provided with a groove 38. Arranged on the outside of housing 36 are a plurality of permanent magnets 7 which produce magnetic fields extending at right angles to the axis of the conveyor 6. Overflow from cathode 31 passes through tube 5 into housing 36 whereupon the nonmagnetic fraction thereof flows downwardly through the grooves 38 of conveyor 6 toward the right end of container 36 and leaves through tube 37 whereupon it is recirculated in a manner later to be described. The magnetic fraction, which consists of a suspension of the elongated particles in the liquid metal is transported by conveyor 6 toward the left hand end of housing 36; magnets 7 preventing this material from flowing downward to the right even through grooves 38. Surrounding a portion of housing 36 is an ageing furnace 8 on each side of which are arranged cooling coils 9 which serve to condense evaporating metal in the furnace; the condensed, nonmagnetic metal being passed to the right in the manner described above. The mixture of the elongated particles of the ferromagnetic metal and the liquid metal passes out through outlet 11 after which it is processed further in known manner to obtain magnet bodies.

Housing 36 is provided with an inlet opening 12 and outlet opening 45 for a suitable inert gas, such as nitrogen, which is passed through housing 36 to thereby prevent undesired reactions.

The nonmagnetic liquid metal leaving housing 36 through tube 37 is collected in a small reservoir 39 from which it is forced up through a tube 13 into reservoir 15. While this can be done in various manners, such as with gear-type pumps, we have found that it is effected more efficiently by means of a liquid pump. More particularly, water under pressure is introduced into a tube 14 which joins the lower portion of tube 13 whereby the liquid metal is carried upward. In order to remove any water that may reach reservoir 15, this reservoir is provided with an overflow pipe 27 which is provided with a loop to trap any liquid metal which may be carried along with the water and return the same through a tube 40 to reservoir 39.

In some cases it may be desirable to carry out the electrolysis with an electrolytic cell having a plurality of cathodes and, if desired, a plurality of anodes. In such a case it is desirable to employ a distributor which distributes the nonmagnetic metal liquid, but which requires only one magnetic dosing device. As shown in FIGURES 2, 3 and 4 such a distributor comprises a cup-shaped member 20 provided with a plurality of openings 21 arranged on a circular center line (see FIGURE 3). Under each of the openings 21 is arranged a tube 33, such as shown in FIGURE 1, each of which is connected to the container 2 of one of the cathodes. Arranged within member 20 is a rotary valve 22 having a cavity provided with a lower opening 41 adapted to align with the openings 21 and a large upper opening 42 into which extends the lower end of the dosing device 17 described in connection with FIGURE 1. Fixedly secured to rotor 22 is a shaft 23 provided with a cam 24 (see FIGURE 4) which engages a contact 25. Contact 25 is connected through a suitable source, shown as battery 43, to the solenoid 19. Cam 24 is so arranged on shaft 23 that the contact 25 will close to thereby energize solenoid and open valve 26 each time the opening 41 of rotor 22 is located above one of the openings 21. Shaft 23 is driven in a suitable manner, for instance by an electric motor with spaced control device (not shown).

While we have described our invention in connection with specific examples we do not desire to be limited thereto as obvious modifications will readily present themselves to one skilled in this art.

What is claimed is:

1. In a device for continuously manufacturing small elongated particles of ferromagnetic material, an electrolytic apparatus for producing a supply of particle-containing mercury comprising, a cup-shaped container adapted to be filled to the rim with a solution of ions of the ferromagnetic material, an anode, and a cathode spaced from said anode and including a cup-shaped member adapted to be filled to its rim with mercury, said member being arranged within said container with its rim below the rim of said container and with its wall spaced from the container to form a passageway therewith, means to intermittently supply mercury to said cup-shaped member at a point below the rim thereof to thereby cause particle-containing surface portions of the mercury to intermittently flow over the rim of the member and precipitate through said passageway, and means to withdraw the precipitated particle-containing mercury from the container.

2. An apparatus as defined in claim 1 including means to dampen the vibration of the surface of the mercury.

3. Apparatus as defined in claim 1 including a perforated plate located below the rim of the cup-shaped member to thereby dampen vibrations in the surface of the mercury.

References Cited in the file of this patent

UNITED STATES PATENTS

| 501,783 | Hermite et al. | July 18, 1893 |
| 2,093,770 | Billiter | Sept. 21, 1937 |
| 2,239,144 | Dean et al. | Apr. 22, 1941 |
| 2,367,811 | Urban | Jan. 23, 1945 |
| 2,624,702 | De Merre | Jan. 6, 1953 |
| 2,974,104 | Paine et al. | Mar. 7, 1961 |

FOREIGN PATENTS

| 855,883 | France | May 22, 1940 |